(No Model.)

J. J. NAEF.
PROCESS OF RECOVERING TIN FROM SCRAP.

No. 477,220. Patented June 21, 1892.

WITNESSES: Wm D. Bell, D. Robertson.

INVENTOR: John J. Naef
BY Gartner & Co
ATTORNEYS

United States Patent Office.

JOHN J. NAEF, OF PATERSON, NEW JERSEY.

PROCESS OF RECOVERING TIN FROM SCRAP.

SPECIFICATION forming part of Letters Patent No. 477,220, dated June 21, 1892.

Application filed February 27, 1892. Serial No. 422,983. (No specimens.)

*To all whom it may concern:*

Be it known that I, JOHN J. NAEF, a citizen of the United States, residing in Paterson, county of Passaic, and State of New Jersey, have invented certain new and useful Improvements in the Process of Recovering Tin from Tinned Scraps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Heretofore tin was recovered from tinned iron or tinned scraps by means of chlorine gas, pure or mixed with cold or heated air.

The object of my invention is to recover tin from tinned scraps by means of electricity, which process is simple, cheaper, and more reliable.

The invention consists in the new and improved process whereby the tin from the tinned scraps is removed and dissolved in a stannic-salt solution and is precipitated on lead plates, by the action of an electric current, in pure chemical state, either in crystals or in powder.

To better illustrate my invention, reference can be had to the accompanying drawings, in which like letters of reference indicate corresponding parts in each of the figures.

Figure 1:
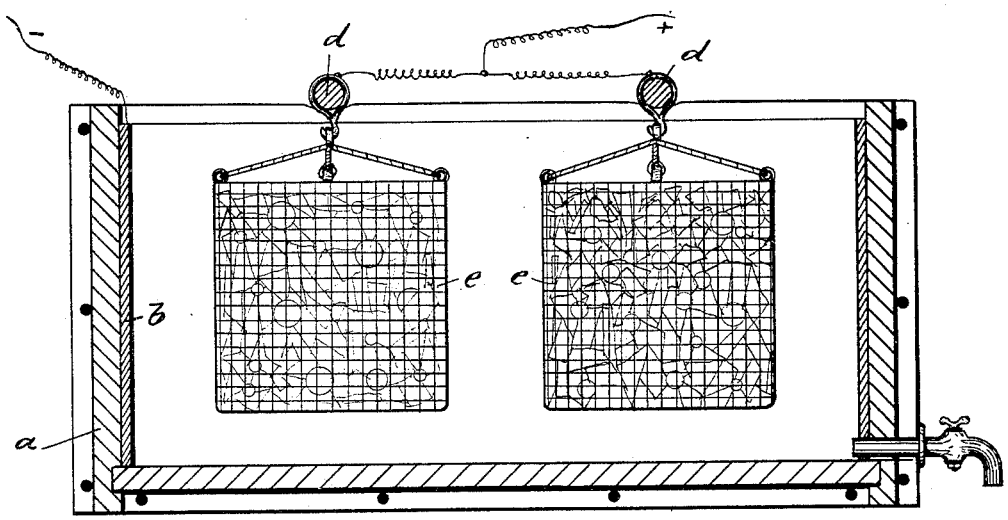
Figure 2:

Figure 1 is a sectional view of an apparatus adapted for my process, and Fig. 2 is a detail view of a modified form of cathode used in connection with said apparatus.

In carrying out my process I take a vat $a$ and cover its inside with thin lead plates $b$, preferably corrugated, as shown in Fig. 2. These lead plates are connected with the negative pole of a battery or dynamo and form the cathode in my improved apparatus. Across the vat $a$ are arranged supporting bars or rods $d$, from which are suspended netted bags $e$, made out of twine, lead wire, or any other material which will not be affected by stannic salt. In these bags the tinned iron or tinned scraps are placed and are connected with the positive pole of said battery or dynamo, thus forming the anode for the apparatus. The vat $a$ is filled with a concentrated solution of stannic chloride or of any other suitable stannic salt, and the current of the battery or dynamo is then started. The tin of the tinned iron or scraps is dissolved by the stannic salt and an equal amount of tin (crystallic or powdered) is precipitated on the lead plates.

This process is continued until all the tin from said scraps is recovered, when new scraps are placed in the bags.

I do not claim the use of iron plates inside of a vat, as such plates are very easily affected by the stannic-salt solution.

Having thus described my invention, what I claim as new, and desire to secure by Letters Patent, is—

1. The process of recovering tin from tinned scraps, which consists in suspending the scraps in a stannic-salt solution containing lead plates, and then passing an electric current from the tinned scraps to the lead plates, whereby the tin will be dissolved from the scraps and precipitated on the lead plates.

2. The combination of the vat lined with lead plates, the netted bags suspended in said vat, and connections for passing an electric current to the scrap in the bags and from the lead plates, substantially as and for the purposes set forth.

In testimony that I claim the foregoing I have hereunto set my hand this 23d day of February, 1892.

JOHN J. NAEF.

Witnesses:
ALFRED GARTNER,
WM. D. BELL.